United States Patent [19]

Janiaud et al.

[11] Patent Number: 5,170,665
[45] Date of Patent: Dec. 15, 1992

[54] ACCELEROMETRIC SENSOR WITH FLECTIONAL VIBRATORY BEAMS

[76] Inventors: Denis Janiaud, 2, avenue du Berry - Bat E3 - Residence Millepertuis, 91940 Les Ulis; Serge Muller, 8, Impasse de la Remarde, 92290 Ollainville, both of France

[21] Appl. No.: 561,020

[22] Filed: Aug. 1, 1990

[30] Foreign Application Priority Data

Aug. 8, 1989 [FR] France ................. 89 10662

[51] Int. Cl.$^5$ .............................................. G01P 15/08
[52] U.S. Cl. .......................... 73/517 AV; 73/DIG. 1
[58] Field of Search ..... 73/DIG. 1, DIG. 4, 517 AV, 73/862.59

[56] References Cited

U.S. PATENT DOCUMENTS

| | | | |
|---|---|---|---|
| 4,479,385 | 10/1984 | Koehler | 73/517 AV |
| 4,751,849 | 6/1988 | Paros et al. | 73/862.59 |
| 4,766,768 | 8/1988 | Norling et al. | 73/517 AV |
| 4,881,408 | 11/1989 | Halsing, II et al. | 73/517 AV |
| 4,939,935 | 7/1990 | Amand | 73/517 AV |

FOREIGN PATENT DOCUMENTS

| | | | |
|---|---|---|---|
| 8910568 | 11/1989 | PCT Int'l Appl. | 73/517 AV |
| 0794546 | 1/1981 | U.S.S.R. | 73/517 AV |
| 2121953A | 1/1984 | United Kingdom | 73/517 AV |
| 2174500A | 5/1985 | United Kingdom | 73/517 AV |
| 2162314 | 7/1985 | United Kingdom | 73/517 AV |

Primary Examiner—Michael T. Razavi
Assistant Examiner—Raymond Y. Mah

[57] ABSTRACT

The accelerometric sensor is of the type comprising a fixed mass, a mobile mass and two flectional vibrating beams each having ends that are linked to the masses. According to the invention, the masses and the beams consist of one single piece machined in a same plate of material of uniform thickness, e.g. in a piezoelectric material such as quartz. The single piece preferably comprises two second beams each having ends that are integral with the masses and placed on both sides of the vibratory beams. The flexural stiffness of the second beams is higher than that of the vibrating beams.

11 Claims, 2 Drawing Sheets

ACCELEROMETRIC SENSOR WITH FLECTIONAL VIBRATORY BEAMS

BACKGROUND OF THE INVENTION

1. Field of the Invention

The present invention relates to an accelerometric sensor that can be placed, e.g. as an accelerometer, in missiles or satellites to guide them, or as an inclinometer on an offshore drilling terminal.

More particularly, the sensor works flectionally and comprises a fixed mass part, a mobile mass part and two vibrating beams or blades each having ends rigidly fastened to the mass parts, respectively. Such a sensor takes advantage of the high sensitivity of the frequency of a flectional vibrating beam, under compression or tensile forces that exerted longitudinally to the beam when the mobile mass part is subjected to a transverse acceleration. The signal leaving the sensor is a function of a differential frequency of the two beams which can be easily used to deduct the value of the acceleration or of the banking of a plane by comparison with the earth's gravitational field.

2. State of the Prior Art

Such a sensor called a double resonator cantilever sensor is disclosed in the U.S. Pat. No. 4,479,385 to Koehler. The mass parts are comprised of mass pavings of which one is affixed to a base. The beams are rectangular plates of quartz supporting appropriate electrodes and are completely distinct and separable from the mass pavings. These beams form braces between the mass pavings. Each beam has flat ends respectively fixed to coplanar sides of the pavings.

The known sensor shown in U.S. Pat. No. 4,479,385 offers three main drawbacks.

A first drawback of this known sensor is a low acceleration sensitivity, typically a maximum frequency variation of 100 to 300 Hz for resonator beams with a natural frequency of 40 kHz. The maximum relative frequency variation is therefore in the region of $\Delta f/f = 200/40,000 = 0.5\%$.

This drawback is due to the fact that the mobile part is only fastened to the fixed part by two beams with flexural stiffness that is not very high. The mass of the mobile part must therefore be limited to a low value for the natural frequency of the sensor to be greater than 2,000 Hz as per recommendations for accelerometers. Furthermore, the beams may twist due to relatively low stiffness.

Another drawback of the known sensor, also due to the low value of the mobile mass, is in relation to the need for vibratory decoupling of the vibrating beams in order for the latter to vibrate independently of one another. Each of the beams consists preferably of a double-ended tuning fork type resonator.

A third drawback of the known sensor concerns the assembling together of the different elements, mass parts and vibrating beams or transducer beams. This assembly is very significant in the cost price of the sensor, as well as in the sensor performances as a result of its qualities.

OBJECTS OF THE INVENTION

The main object of this invention is to provide an accelerometric sensor remedying the drawbacks of the prior art.

Another object of this invention is to avoid any assembly of separable parts in an accelerometric sensor.

SUMMARY OF THE INVENTION

Accordingly, an accelerometric sensor comprises a fixed mass part, a mobile mass part and two flectional vibrating beams constituting one single piece machined in a same plate of material with uniform thickness.

This feature enables the single-piece sensor to be chemically machined in a plate of solid elastic material, e.g. in a piezoelectric material such as quartz, thereby reducing not only the time required to manufacture and the cost of the sensor, but also the dimensions of the sensor.

The single-piece character of the sensor body provides excellent definition to the geometry of the various parts of the sensor, thereby contributing even further to reducing the cost and improving the performances of the sensor. Preferably, the mass parts have in their thickness a common mid-plane on both sides of which said vibrating beams extend. These vibratory beams have parallel longitudinal axes that are offset and contained in a plane oblique to the mid-plane of the mass parts.

According to other features of the invention, the single-piece body of the sensor comprises two second beams each having ends that are integral with the mass parts and placed on both sides of the vibrating beams or transducer beams. The flexural stiffness of the second beams is higher than that of the vibrating beams. Under these conditions, the mobile part can have a high mass, in the region of 1,000 times the mass of a simple vibrating beam and ensures good mechanical isolation between the vibrations of the beams. In practice, the relative frequency variation is in the region of 5% for an acceleration of 100 G, the sensor having a natural frequency of 5,000 Hz. This relative frequency variation is therefore ten times greater than that of the sensor in U.S. Pat. No. 4,479,385.

BRIEF DESCRIPTION OF THE DRAWINGS

Further features and advantages of the invention will be apparent from the following particular description of several preferred embodiments of this invention as illustrated in the corresponding accompanying drawings in which.

DESCRIPTION OF THE PREFERRED EMBODIMENTS

Figure 1:
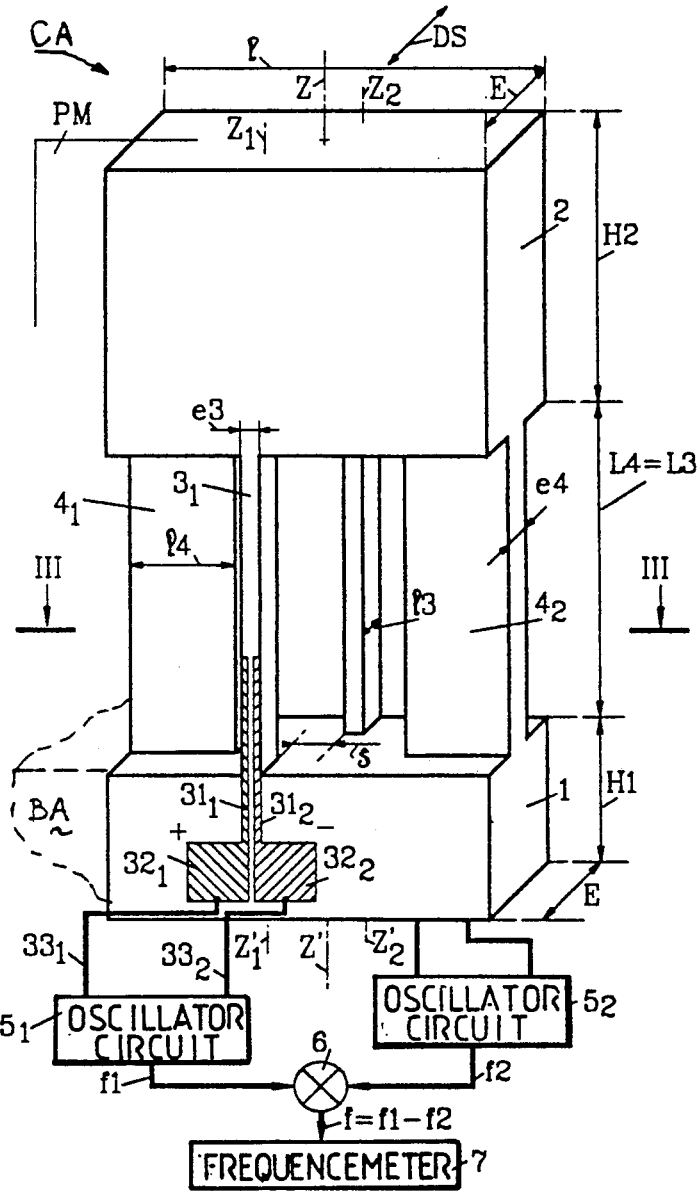
FIG. 1 is a perspective view of the body of a sensor embodying the invention, and schematically shows frequency measuring means associated to the sensor.

As shown in FIG. 1, the body of a sensor CA embodying the invention is produced by chemical machining of a plate of piezoelectric material, such as quartz, having a uniform thickness E. The body of the sensor CA is therefore in one single piece.

Figure 2:
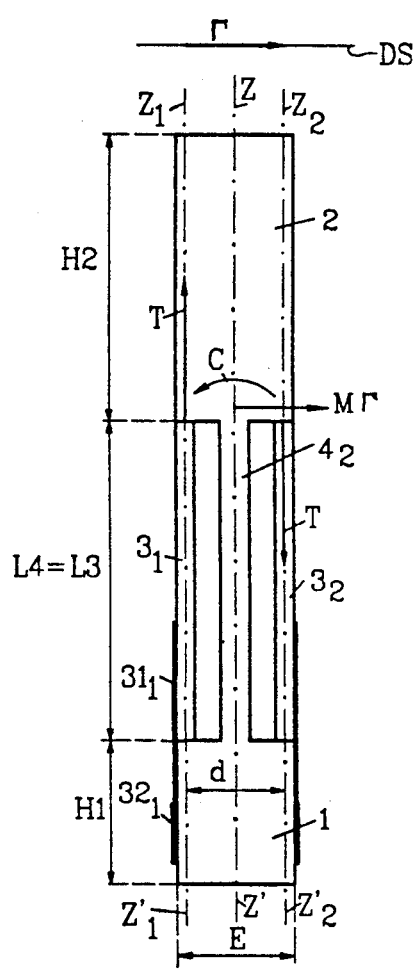
FIG. 2 is a longitudinal side view of the sensor body of FIG. 1.
Figure 3:
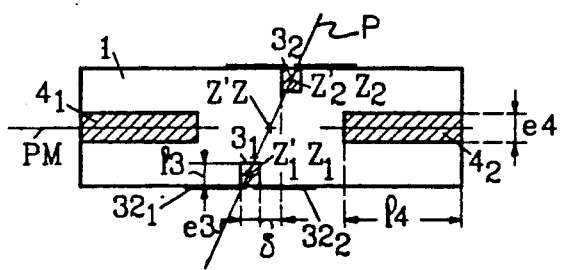
FIG. 3 is a cross-sectional view along the plane III—III of FIG. 1.

According to the embodiment illustrated in FIGS. 1 to 3, the body of the sensor CA is usually in parallelepiped form that extends vertically in this instance in the direction of its length materialized by a central longitudinal axis Z'Z. This axis Z'Z is contained in a mid-plane PM of the plate parallel to its sides.

According to the embodiment illustrated, the axis Z'Z is an axis of symmetry of the sensor.

The sensor CA comprises a fixed mass part 1 and a mobile mass part 2 formed by parallelepiped parts placed at the longitudinal ends of the sensor body, and thus having thickness and width equal to those E and l of the body. The heights H1 and H2 of parts 1 and 2 are generally different, and preferably H1<H2. The fixed part 1 is intended to be rigidly affixed to the structure of a engine, missile or satellite via a case base BA. The fixed block 1 is fixed to the base BA e.g. by glueing. The part 2 constitutes the mobile mass of the sensor. The displacement acceleration of the engine or its position in the earth's field of gravity is measured by means of the sensor CA depending on whether the latter is used as an accelerometer or as an inclinometer.

The body of the sensor CA also comprises two identical first vibrating beams $3_1$ and $3_2$, and two identical second beams $4_1$ and $4_2$ of bigger cross-section that the first beams, for linking the first parts 1 and 2. The beams $3_1$, $3_2$ and $4_1$, $4_2$ are placed substantially crossways and extend parallel to the axis Z'Z.

The first beams $3_1$ and $3_2$ have a small horizontal transversal rectangular cross-section defined by a thickness e3 (FIG. 3) and a width 13 (FIG. 1) taken according to the width l and the thickness E of the sensor body, respectively. The width 13 of the first beams is less than E/2, and the longitudinal edges of the beams $3_1$ and $3_2$ pointing outwards from the body are coplanar with the major sides of the parts 1 and 2 of the sensor and therefore with the sides of the plate of material. Furthermore, when the body has been obtained by chemical machining, the beams $3_1$ and $3_2$ are offset relative to each other by a small distance $\delta$, i.e. the axes $Z'_1Z_1$ and $Z'_2Z_2$ of the first beams are in a plane P that is oblique to the plane PM. The transversal cross-sections of the beams $3_1$ and $3_2$ illustrated in cross-section in FIG. 3 are $\delta/2$ away from a plane perpendicular to the plane PM and passing through the axis Z'Z. The beams $3_1$ and $3_2$ constitute blades vibrating flecturally (e.g., in a direction parallel to the mid-plane PM).

The vibrations of the blades $3_1$ and $3_2$ are maintained at their natural resonances by means of two conventional electronic oscillator circuits $5_1$ and $5_2$, as shown in FIG. 1. The electrical excitation of each blade, e.g., of blade $3_1$, is obtained by two electrodes $31_1$ and $31_2$ printed in the form of two parallel narrow strips that are symmetrical in relation to the longitudinal mid-plane of the blade, and situated at the end of the external longitudinal edge of the blade adjoining the fixed part 1. On the corresponding side of the fixed part 1, the electrodes $31_1$, $31_2$ of the blade $3_1$ are ended by two plates $32_1$ and $32_2$, square in this instance, onto which are welded two respective conducting wires $33_1$ and $33_2$ connected to adequate terminals of the oscillator circuit $5_1$.

The blades $3_1$ and $3_2$ thus vibrate flectionally parallel to the plane PM. However, according to other dispositions of the electrodes, the latter may vibrate at right angles to the plane PM.

Outputs of the circuits $5_1$ and $5_2$ transmit two respective frequency signals $f_1$ and $f_2$ to the inputs of a conventional frequency subtracting circuit 6 which provides a signal having the differential frequency $f = f_1 - f_2$ measured by a frequency meter 7.

The second beams $4_1$ and $4_2$ also extend out parallel to the axis Z'Z but have mid-planes parallel to the plane PM and, according to FIGS. 1 to 3, merging with the plane PM. The width 14 of the second beams is less than $(1-(2 \cdot e3 + \delta))/2$. The thickness e4 of the second beams is preferably well below E. In FIGS. 1, 2, 4 and 5, the length L3 of the first beams $3_1$ and $3_2$ is equal to the length L4 of the second beams $4_1$ and $4_2$, these lengths being taken vertically in this instance in the direction of the fixed and movable mass heights H1 and H2, respectively.

In fact, according to other embodiments, one or both of the two parts 1 and 2 has a T-shaped front contour L3<L4, or a U-shaped front contour L3>L4. The second beams $4_1$ and $4_2$ constitutes flexible articulations across their thickness when the sensor CA is subjected to an acceleration in the transversal sensitive direction DS.

The sensor embodying the invention thus constitutes a monaxial sensor, along the sensitive direction DS perpendicular to the plane PM.

The operation of the sensor is as follows with reference to FIG. 2 which shows the main stresses exerted by the mobile mass 2 on the vibratory blades $3_1$ and $3_2$ and on the articulations $4_1$ and $4_2$ when the sensor CA is subjected to an acceleration $\Gamma$ applied along the sensitive direction DS.

One $3_1$ of the blades is subjected to a tensile force, and the other blade $3_2$ is subjected to a compression force. These two forces are of the same intensity T if the two blades $3_1$ and $3_2$ are identical. For the purposes of simplifying calculations, the two blades are supposed identical, notwithstanding that the sensor embodying the invention works properly with two different blades, i.e. with different blade thicknesses and/or widths.

The articulations $4_1$ and $4_2$ are subjected on the one hand to a moment of flexure C and, on the other hand, to a transverse force almost equal to $M\Gamma$, M being the mass of the mobile part. As the flexural strength of the blades $3_1$ and $3_2$ is considerably lower than that of the articulations $4_1$ and $4_2$, the transverse forces and the moments of flexion brought to bear on the blades can be neglected.

The expression of the forces T is obtained by solving a system of equations which translates the equilibrium of the mobile mass, as well as the mechanical behaviour of the blades and articulations. A force intensity proportional to the acceleration $\Gamma$ is obtained:

$$T = \chi M\Gamma,$$

whereby $\chi$ designates the multiplicative coefficient of $M\Gamma$ such that $$\chi = [(H2+L)/2d][1/(1+2I_a/(sd^2))]$$

where

L = L3 = L4 and d = E − 13,

Ia is the sum of the sectional moments of inertia of the two articulations $4_1$ and $4_2$, and s = 13·e3 is the cross-section of a vibrating blade $3_1$, $3_2$.

The blades are therefore subjected to forces T having an intensity equal to $\chi$ times $M\Gamma$. The multiplicative coefficient $\chi$ can easily reach several unities, even with articulations that are much stiffer than the vibrating blades.

The tensile and compression forces brought to bear on the blades $3_1$ and $3_2$ are the cause of opposite frequency variations for the two blades $$\Delta f_1 = +k\ T$$

$$\Delta f_2 = -k\ T$$

where k is a coefficient depending upon the cross-section of the vibrating blades and upon characteristics of the piezoelectric material. The resonance frequencies of the two blades $3_1$ and $3_2$ are written as a function of the acceleration $\Gamma$:

$$f_1 = f_o + k\chi\Gamma M$$

$$f_2 = f_o - k\chi\Gamma M.$$

where $f_o$ is the resonance frequency of the blades in the blades in the absence of acceleration. The frequency f is then expressed:

$$f = f_1 - f_2 = 2k\chi\Gamma M$$

The variations of the frequency f are therefore representative of the variations of the acceleration $\Gamma$ applied to the sensor in the sensitive direction DS. The point in carrying out measurements depending on the difference of the frequencies $f_1$ and $f_2$ is, on the one hand, that the influence of the spurious input quantities, such as temperature mainly, are notably reduced, and on the other hand, that the sensitivity of the sensor to acceleration is the sum of the sensitivities of the two blades.

It should be noted that the geometry of the sensor CA illustrated in FIGS. 1 to 3 is a preferential geometry of which the advantages are given hereinafter by comparison with other embodiments of the sensor of the invention.

The mid-plane of each of the articulation beams $4_1$ and $4_2$ coincides preferably with the mid-plane PM of the plate so as to cancel the effects of an acceleration parallel to the axis ZZ'. In fact, in this instance of acceleration at right angles to the sensitive direction DS, the vibrating blades $3_1$ and $3_2$ undergo same residual tensile or compression stresses, and the frequency variations $\Delta f_1$ and $\Delta f_2$ are equal in modulus and in sign for the two blades. The differential frequency f does therefore not present any variation for a transverse acceleration.

It is desirable that the flexural stiffness of the articulations $4_1$ and $4_2$ be considerably greater than the flexural strength of the blades $3_1$ and $3_2$. The mobile mass 2 is thus well held and, despite a considerable mobile mass, the sensor complies with the usual specification concerning the natural frequency of accelerometers: no structural resonance frequency below 2,000 Hz.

It is particularly interesting for the articulations $4_1$ and $4_2$ to have high stiffness as this enables a sufficiently big mobile mass 2 to be chosen in order to put the sensitivity of the vibrating blades to their best advantage. Typically, the mass of the aforesaid mobile part 2 is approximately 1,000 times that of a simple beam $3_1$, $3_2$. It is thus possible to produce a sensor with a natural frequency of 5,000 Hz and for which each of the vibratory beams $3_1$, $3_2$ has a relative frequency variation of 5% for an applied acceleration of 100 G.

According to the embodiment illustrated in FIGS. 1 and 2, the plane P containing the center axes $Z'_1Z_1$ and $Z'_2Z_2$ of the offset beams $3_1$ and $3_2$ is oblique and not perpendicular to the plane PM. The gap $\delta$ between the two blades enables the sensor body to be produced by chemical machining and is not detrimental to the good functioning of the sensor as a result of the presence of the articulations $4_1$ and $4_2$.

Figure 4:
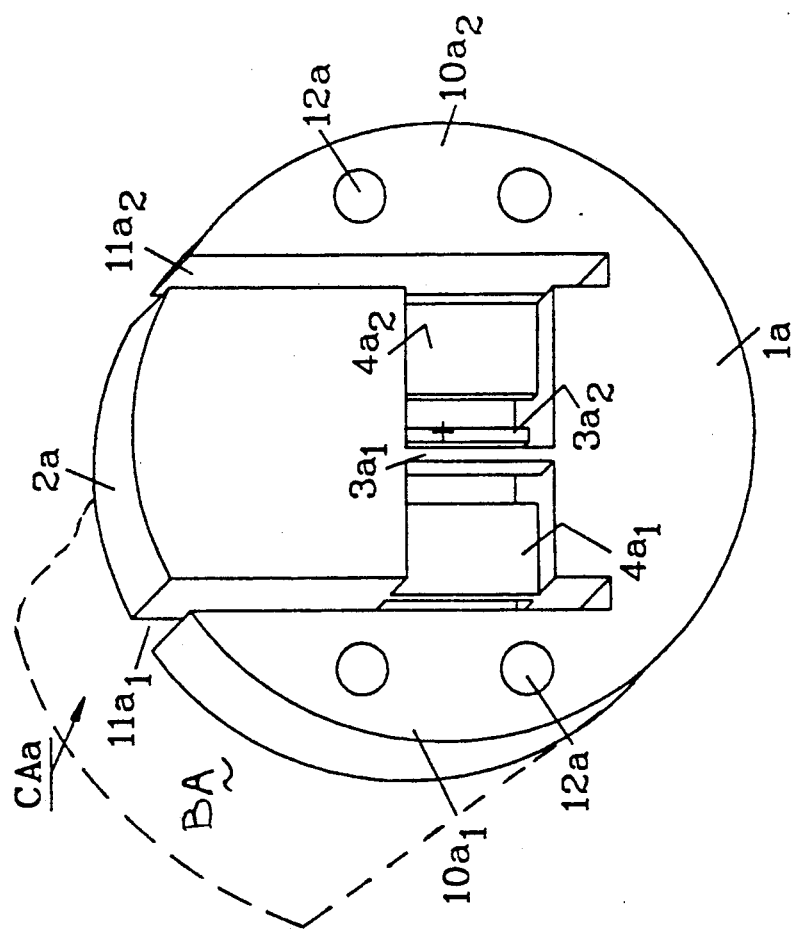
FIG. 4 is a perspective view of another sensor body embodying the invention.
Figure 5:
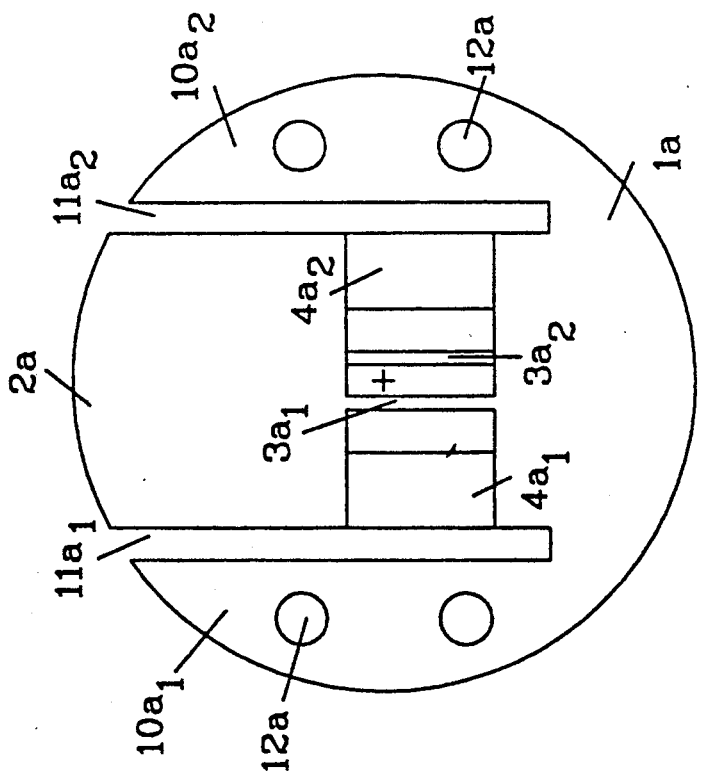
FIG. 5 is a front view of the sensor body of FIG. 4.

Another embodiment of a sensor CAa embodying the invention is shown in FIGS. 4 and 5. The sensor CAa comprises a single-piece body, in quartz, which is obtained by chemical machining using photolithography processes, from a plate of quartz of which the mid-plane is orthogonal to the crystallographic axis Z.

The sensor CAa is discoid generally disk-shaped and comprises a fixed part 1a, a mobile part 2a, blades $3a_1$ and $3a_2$, and articulations $4a_1$ and $4a_2$ similar to those of the sensor CA.

Compared to the sensor CA, the fixed part 1a comprises two branches $10a_1$ and $10a_2$ in the form of discoid segments along the longitudinal edges of the mobile part 2a and the articulations $4a_1$ and $4a_2$ and extending up to the end of the mobile mass 2a.

Narrow slits $11a_1$ and $11a_2$ thus separate the fixed part branches $10a_1$ and $10a_2$ and the longitudinal edges of the mobile part 2a. Four holes 12a are drilled in the branches for the passage of sealed electrical crossings from a case base of the sensor. The fixed part 1a is fastened to the base in the region of the holes 12a, i.e. sufficiently far away from the vibrating blades $3a_1$ and $3a_2$ so as not to alter the quality of their vibrations.

The circular contour of the body of the sensor CAa ensures the compactness required to integrate it into a compact cylindrical case.

What we claim is:

1. An accelerometric sensor, comprising:
   (a) a unitary generally parallelepiped plate-like member containing along its central longitudinal axis in a direction parallel with its sides a central plane (PM) and including at one end a fixed mass part (1);
   (b) said member including at its other end a movable mass part (2), said member having a uniform thickness defining the thickness of said mass parts;
   (c) two flectional vibrating beams ($3_1$,$3_2$) that extend longitudinally between said mass parts and each having ends integral with said mass parts, respectively; and
   (d) two second beams ($4_1$,$4_2$) extending longitudinally between said mass parts and each having ends integral with said mass parts, respectively, said second beams having longitudinal central axes contained in said central plane;
   (e) said vibrating beams being formed by chemical machining from said plate-like member with the longitudinal axes of said vibrating beams being offset relative to each other on opposite sides of said central plane and being contained in a plane P that is obliquely arranged relative to said central plane;
   (f) said second beams having a flexural stiffness higher than the flexural stiffness of said vibrating beams.

2. The accelerometric sensor claimed in claim 1, wherein said vibrating beams have a generally rectangular cross-sectional configuration, the remote surfaces of said vibrating beams being coplanar with the associated side surfaces of said fixed and mobile masses, respectively, with said remote surfaces defining the smaller thickness dimension of said vibrating beams; and further wherein said second beams have a rectangular configuration with the larger width axes thereof being coplanar with the central plane of said plate.

3. The accelerometric sensor claimed in claim 1, wherein said vibrating beams are identical.

4. The accelerometric sensor claimed in claim 1, wherein said plate-like member is formed from piezoelectric material having a uniform thickness, and further wherein said vibrating beams and said fixed part have two coplanar sides, and pairs of electrodes supported by said coplanar sides, respectively.

5. The accelerometric sensor claimed in claim 1, wherein the transverse cross-sections of said second beams are greater than the cross sections of said vibrating beams, respectively.

6. The accelerometric sensor claimed in claim 1, wherein said vibrating beams have major longitudinal sides that are parallel to one another and perpendicular to major longitudinal sides of said second beams.

7. The accelerometric sensor claimed in claim 1, wherein said second beams are identical.

8. The accelerometric sensor claimed in claim 2, wherein the transverse cross-sections of said second beams have width and thickness dimensions that are less than the half-width and half-thickness of said mass parts, respectively.

9. The accelerometric sensor claimed in claim 1, wherein said fixed part comprises branches extending along longitudinal edges of said second beams and said movable part, and means for fixing said branches of said fixed part to a base.

10. The accelerometric sensor claimed in claim 1, wherein said plate like member is made from piezoelectric material.

11. An accelerometric sensor, comprising:
 (a) a unitary generally parallelpiped plate-like member containing along its central longitudinal axis in a direction parallel with its sides a central plane (PM) and including at one end a fixed mass part adapted for attachment to a base;
 (b) a mobile mass part;
 (c) two flectional vibrating beams each having ends that are integral with said mass parts, respectovely;
 (d) two second beams each having ends that are integral with said mass parts, said second beams having a flexural stiffness higher than the flexural stiffness of said vibrating beams; and
 (f) two pairs of electrode strips extending on coplanar sides of said vibrating beams and said fixed part,
 (g) said fixed and mobile mass parts and said vibrating and second beams constituting one single piece formed from a piezoelectric material plate having a uniform thickness, said vibratory beams being formed by chemical machining from said plate and being offset relative to each other on opposite sides of said central plane, the longitudinal axes of said vibratory beams being contained in a plane P that is obliquely arranged relative to said central plane.

* * * * *